(12) United States Patent
Han et al.

(10) Patent No.: US 11,886,817 B2
(45) Date of Patent: Jan. 30, 2024

(54) ELECTRONIC APPARATUS AND METHOD FOR CONTROLLING THEREOF

(71) Applicant: SAMSUNG ELECTRONICS CO., LTD., Suwon-Si (KR)

(72) Inventors: Hyojung Han, Suwon-si (KR); Sathish Indurthi, Suwon-si (KR); Beomseok Lee, Suwon-si (KR); Mohd Abbas Zaidi, Suwon-si (KR); Nikhil Kumar, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 336 days.

(21) Appl. No.: 17/432,446

(22) PCT Filed: Jul. 27, 2021

(86) PCT No.: PCT/KR2021/009676
§ 371 (c)(1),
(2) Date: Aug. 19, 2021

(87) PCT Pub. No.: WO2022/145611
PCT Pub. Date: Jul. 7, 2022

(65) Prior Publication Data
US 2023/0153529 A1 May 18, 2023

(30) Foreign Application Priority Data
Dec. 28, 2020 (KR) .................. 10-2020-0184579

(51) Int. Cl.
*G06F 40/284* (2020.01)
*G06F 40/58* (2020.01)
(52) U.S. Cl.
CPC .......... *G06F 40/284* (2020.01); *G06F 40/58* (2020.01)

(58) Field of Classification Search
CPC ........ G06F 40/284; G06F 40/58; G06F 40/56; G06F 40/45; G06N 3/04; G06N 3/08; G06N 3/045; G06N 3/044
See application file for complete search history.

(56) References Cited

U.S. PATENT DOCUMENTS 8,543,376 B2  9/2013  Hwang et al.
9,940,325 B2  4/2018  Shen et al.
(Continued)

FOREIGN PATENT DOCUMENTS

JP  2019057244 A  *  4/2019
JP  2019-185392  10/2019
(Continued)

OTHER PUBLICATIONS

Gu et al., "Levenshtein Transformer", Computer Science > Computation and Language, Cornell University, arXiv.org, arXiv:1905. 11006, Submitted on May 27, 2019 (v1), last revised Oct. 28, 2019 (this version, v2), 17 pages.
(Continued)

*Primary Examiner* — Yogeshkumar Patel
(74) *Attorney, Agent, or Firm* — Nixon & Vanderhye, P.C.

(57) ABSTRACT

An electronic apparatus is disclosed. The electronic apparatus includes: an inputter comprising input circuitry configured to acquire an input sentence of a first language including a plurality of input tokens, a memory configured to store at least one instruction, and a processor, wherein the processor is configured to control the electronic apparatus to: acquire at least one first input token identified up to a first time point among the plurality of input tokens and acquire at least one first output token generated by translating the at least one first input token by inputting the at least one first input token and the at least one first output token into a learned first neural network model, identify an operation to
(Continued)

be performed at a second time point after the first time point among a first operation configured to identify at least one second input token other than the at least one first input token among the plurality of input tokens and a second operation configured to generate at least one second output token based on the at least one first input token, and acquire a number corresponding to the identified operation and acquiring an output sentence of a second language different from the first language by translating the input sentence based on the identified operation and the acquired number.

15 Claims, 11 Drawing Sheets

(56) References Cited

U.S. PATENT DOCUMENTS

| | | | |
|---|---|---|---|
| 10,229,111 B1* | 3/2019 | Filippova | G06F 40/42 |
| 10,963,652 B2 | 3/2021 | Hashimoto et al. | |
| 11,126,800 B2 | 9/2021 | Ma et al. | |
| 11,270,079 B2 | 3/2022 | Tu et al. | |
| 11,361,169 B2 | 6/2022 | Dvorkovich et al. | |
| 2010/0268525 A1 | 10/2010 | Kim et al. | |
| 2016/0117316 A1* | 4/2016 | Le | G06F 40/45 704/9 |
| 2020/0152180 A1* | 5/2020 | Lee | G06F 40/274 |
| 2020/0210465 A1 | 7/2020 | Upadhyay et al. | |
| 2020/0380216 A1* | 12/2020 | Fuerstenau | G06N 3/045 |

FOREIGN PATENT DOCUMENTS

| | | | |
|---|---|---|---|
| JP | 2019185392 A | * | 10/2019 |
| KR | 10-0958340 | | 5/2010 |
| KR | 10-1682207 | | 12/2016 |
| KR | 10-1890835 | | 9/2018 |
| KR | 10-2020-0056001 | | 5/2020 |
| KR | 10-2020-0092446 | | 8/2020 |
| KR | 20200092446 A | * | 8/2020 |
| WO | 2012/027672 | | 3/2012 |

OTHER PUBLICATIONS

Arivazhagan et al., "Monotonic Infinite Lookback Attention for Simultaneous Machine Translation", Computer Science > Computation and Language, Cornell University, arXiv.org, arXiv:1906.05218v1, Submitted on Jun. 12, 2019, 13 pages.

International Search Report and Written Opinion dated Nov. 23, 2021 in corresponding International Application No. PCT/KR2021/009676.

Shin et al., "Research on the Decoder Attention Structure of Multi-encoder Transformer-based Automatic Post-Editing Model", KIISE Transactions on Computing Practices, vol. 26, No. 8, pp. 367-372, Aug. 2020.

* cited by examiner

FIG. 6B

|  | x1 | x2 | x3 | x4 | x5 | \<eos\> |
|---|---|---|---|---|---|---|
| y1 | $\alpha_{1,1}$ | $\alpha_{1,2}$ | $\alpha_{1,3}$ | $\alpha_{1,4}$ | $\alpha_{1,5}$ | |
| y2 | $\alpha_{2,1}$ | $\alpha_{2,2}$ | $\alpha_{2,3}$ | $\alpha_{2,4}$ | $\alpha_{2,5}$ | |
| y3 | $\alpha_{3,1}$ | $\alpha_{3,2}$ | $\alpha_{3,3}$ | $\alpha_{3,4}$ | $\alpha_{3,5}$ | |
| y4 | $\alpha_{4,1}$ | $\alpha_{4,2}$ | $\alpha_{4,3}$ | $\alpha_{4,4}$ | $\alpha_{4,5}$ | |
| y5 | $\alpha_{5,1}$ | $\alpha_{5,2}$ | $\alpha_{5,3}$ | $\alpha_{5,4}$ | $\alpha_{5,5}$ | |
| \<eos\> | | | | | | |

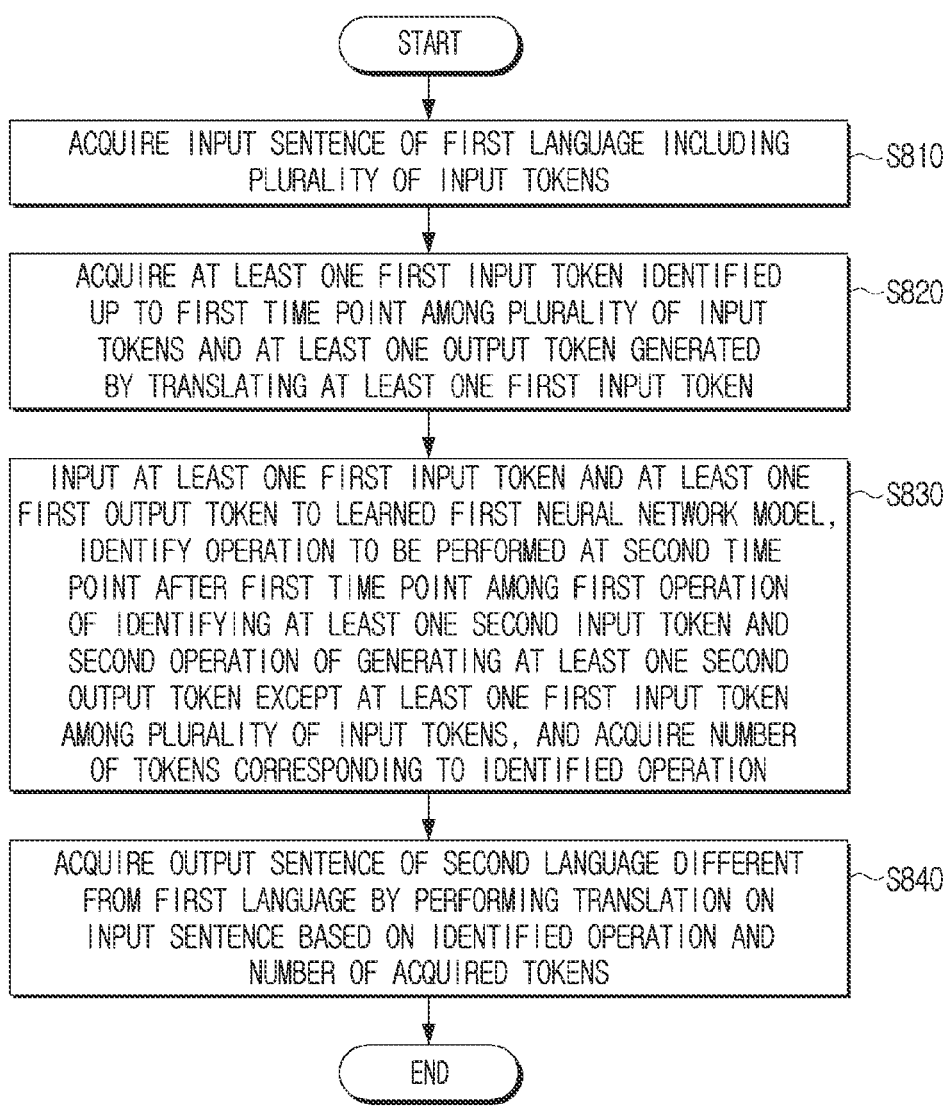

ELECTRONIC APPARATUS AND METHOD FOR CONTROLLING THEREOF

CROSS-REFERENCE TO RELATED APPLICATION

This application is a national stage of International Application No. PCT/KR2021/009676 designating the United States, filed on Jul. 27, 2021, in the Korean Intellectual Property Receiving Office and claiming priority to Korean Patent Application No. 10-2020-0184549, filed on Dec. 28, 2020, in the Korean Intellectual Property Office, the disclosures of which are incorporated by reference herein in their entireties.

BACKGROUND

Field

The disclosure relates to an electronic apparatus and a method for controlling thereof. For example, the disclosure relates to an electronic apparatus for acquiring an output sentence by performing machine translation on an input sentence, and a method for controlling thereof.

Description of Related Art

The artificial intelligence (AI) system may refer, for example, a computer system that implements human-level intelligence, and unlike the existing rule-based smart system, the machine learns, determines, and becomes smarter by itself. As artificial intelligence systems are used, their recognition rate improves and the system can understand users' tastes more accurately. Thus, the existing rule-based smart systems are gradually being replaced by deep learning-based artificial intelligence systems.

Recently, research on neural machine translation (NMT) using artificial intelligence has been actively conducted. Particularly, research on streaming NMT that translates words (or tokens) inputted in real time, rather than translating completed input sentences, is being actively conducted. In the streaming NMT, there are a reading operation that loads an input token into memory and a writing operation that translates the loaded input token to generate an output token. Translation performance or translation speed may be determined depending on which of the reading operation or the writing operation is performed for each time point.

Accordingly, in order to improve translation performance and translation speed, there is a need for a technique for determining which of the reading operation and the writing operation to perform, that is, a decision making method.

SUMMARY

Embodiments of the disclosure provide a machine translation model capable of maximizing and/or improving translation accuracy and minimizing and/or improving translation speed.

Embodiments of the disclosure are not limited to the problems addressed above, and other problems that are not described will be clearly understood by those skilled in the art from the following description.

According to an example embodiment, a method for controlling an electronic apparatus includes: acquiring an input sentence of a first language including a plurality of input tokens, acquiring at least one first input token identified up to a first time point among the plurality of input tokens and at least one first output token generated by translating the at least one first input token, identifying an operation to be performed at a second time point after the first time point among a first operation that identifies at least one second input token other than the at least one first input token among the plurality of input tokens and a second operation that generates at least one second output token based on the at least one first input token, acquiring a number corresponding to the identified operation by inputting the at least one first input token and the at least one first output token into a learned first neural network model, and acquiring an output sentence of a second language different from the first language by translating the input sentence based on the identified operation and the acquired number.

The method may further comprise, based on the second operation and a second number being identified, updating a parameter of a second neural network model learned based on the second number, the second neural network model learned to generate an output token by translating an input token, wherein the acquiring the output sentence includes acquiring an output token of the second number by inputting the at least one first input token into the second neural network model.

The method may further comprise, based on the first operation and a first number being identified, identifying and storing a second input token of the first number among the at least one second input token.

The first neural network model may include an operation determination model learned to identify one of the first operation and the second operation based on the at least one first input token and the at least one first output token, and a token number determination model learned to obtain the number based on the at least one first input token and the at least one first output token.

The token number determination model may include a first model learned to output the number of tokens corresponding to the first operation, and a second model learned to output the number of tokens corresponding to the second operation.

The method may comprise acquiring label data based on the at least one first input token and the at least one first output token; and updating the first neural network model such that a difference between an output value of the first neural network model and the label data is less than a predetermined value.

The acquiring the label data may include inputting the at least one first input token and the at least one first output token into a pre-stored neural network model to acquire the label data based on the acquired output value.

According to an example embodiment, an electronic apparatus includes: an inputter comprising input circuitry configured to acquire an input sentence of a first language including a plurality of input tokens, a memory configured to store at least one instruction, and a processor, wherein the processor is configured to control the electronic apparatus to: acquire at least one first input token identified up to a first time point among the plurality of input tokens and at least one first output token generated by translating the at least one first input token, identify an operation to be performed at a second time point after the first time point among a first operation the identifies at least one second input token other than the at least one first input token among the plurality of input tokens and a second operation that generates at least one second output token based on the at least one first input token, acquire a number corresponding to the identified operation by inputting the at least one first input token and the at least one first output token into a learned first neural network model, and acquire an output sentence of a second language different from the first language by translating the input sentence based on the identified operation and the number of acquired tokens.

The processor may, based on the second operation and a second number being identified, be further configured to update a parameter of a second neural network model, the second neural network model learned to generate an output token by translating an input token, and acquire an output token of the second number by inputting the at least one first input token into the second neural network model.

The processor may, based on the first operation and a first number being identified, be further configured to identify a second input token of the first number among the at least one second input token and store the token in the memory.

The processor may be configured to acquire label data based on the at least one first input token and the at least one first output token, and update the first neural network model such that a difference between an output value of the first neural network model and the label data is less than a predetermined value.

The processor may be configured to input the at least one first input token and the at least one first output token into a pre-stored neural network model to acquire the label data based on the acquired output value.

The disclosure is not limited to the various aspects described above, and aspects that are not described will be clearly understood by those skilled in the art from the disclosure and the accompanying drawings.

According to various example embodiments of the disclosure as described above, the electronic apparatus may generate and output a translated sentence while maximizing and/or improving translation performance and translation speed, thereby improving the user's satisfaction and convenience.

In addition, effects obtained or predicted by the various example embodiments will be disclosed directly or implicitly in the detailed description below.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 6B is a diagram illustrating an example method of acquiring learning data according to various embodiments;

FIG. 8 is a flowchart illustrating an example method of controlling an electronic apparatus according to various embodiments.

DETAILED DESCRIPTION

The terms used in describing various example embodiments will be briefly explained, and various example embodiments will be described in greater detail with reference to the accompanying drawings.

Terms used in the disclosure are selected as general terminologies currently widely used in consideration of the configuration and functions of the disclosure, but can be different depending on intention of those skilled in the art, a precedent, appearance of new technologies, and the like. Further, in specific cases, terms may be arbitrarily selected. In this case, the meaning of the terms will be described in the description of the corresponding embodiments. Accordingly, the terms used in the description should not necessarily be construed as simple names of the terms, but be defined based on meanings of the terms and overall contents of the disclosure.

The example embodiments may vary, and may be provided in different example embodiments. Various example embodiments will be described with reference to accompanying drawings. However, this does not necessarily limit the scope of the example embodiments to a specific embodiment. Instead, modifications, equivalents and replacements included in the disclosed concept and technical scope of this disclosure may be employed. While describing example embodiments, if it is determined that the specific description regarding a known technology obscures the gist of the disclosure, the specific description may be omitted.

The terms such as "first," "second," and so on may be used simply to describe a variety of elements, but the elements should not be limited by these terms. The terms used herein are solely intended to explain various example embodiments, and not to limit the scope of the disclosure.

Singular forms are intended to include plural forms unless the context clearly indicates otherwise. In the present disclosure, the terms "include" and "comprise" designate the presence of features, numbers, steps, operations, components, elements, or a combination thereof that are written in the disclosure, but do not exclude the presence or possibility of addition of one or more other features, numbers, steps, operations, components, elements, or a combination thereof.

The example embodiments of the disclosure will be described in greater detail below in a manner that will be understood by one of ordinary skill in the art. However, example embodiments may be realized in a variety of different configurations, and not limited to descriptions provided herein. Also, well-known functions or constructions may not be described in detail where they would obscure the disclosure with unnecessary detail.

Figure 1:
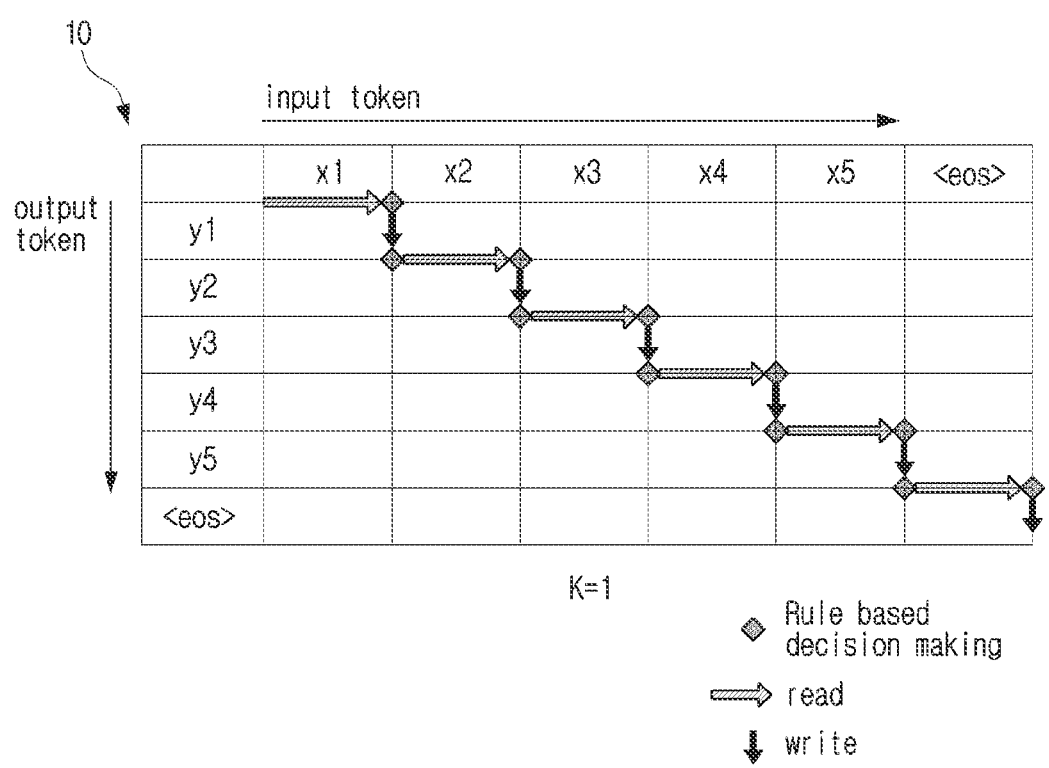
FIG. 1 is a diagram illustrating a conventional translation model.

FIG. 1 is a diagram illustrating an existing machine translation model that performs decision making based on a simple rule. A conventional simultaneous machine translation model referred to as a wait-k model 10 performs a decision based on a predetermined value k. In the disclosure, decision making may refer, for example, to an operation of determining which of a reading operation and a writing operation is to be performed. The wait-k model 10 performs the reading operation as much as a predetermined value and sequentially performs the writing operation as much as a predetermined value. For example, when k is 1, as illustrated in FIG. 1, the wait-k model 10 reads a first input token x1, generates a first output token y1, and generates a second input token x2 and generates a second output token y2, and so on.

As described above, since the wait-k model 10 performs decision making based on a predetermined value, it has an advantage that a processing time (or overhead) for decision making is relatively small. However, the wait-k model 10 generates an output token based on a predetermined rule without considering an input token and a previously output token, and thus has a disadvantage in that a translation performance is somewhat low. For example, in FIG. 1, if the second output token y2 is generated based on only the first input token x1 and the second input token x2, it may be translated as a somewhat inaccurate token.

Figure 2:
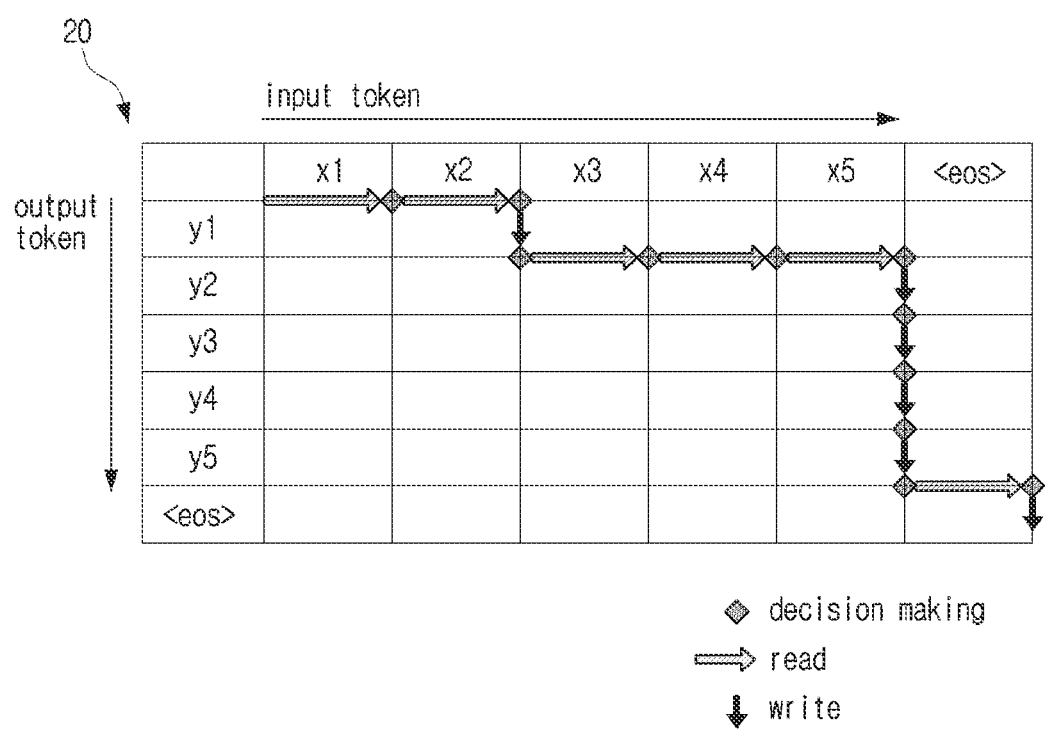
FIG. 2 is a diagram illustrating another conventional translation model.

In order to complement this shortcoming, a machine translation model (hereinafter referred to as MILK model) referred to as a monotonic infinite lookback (MILK) has been developed. FIG. 2 is a diagram illustrating the MILK model. The MILK model 20 determines which of a reading operation and a writing operation is performed by making a decision every time a new input token is acquired. The MILK model 20 makes a decision based on information on the input tokens identified so far and the generated output tokens, and thus, unlike the wait-k model 10, the model may adaptively make a decision. For example, as illustrated in FIG. 2, the MILK model 20 does not read the first input token x1 and immediately write the first output token y1, but additionally reads the second input token x2 and writes the first output token y1 after reading the first input token x1. Unlike the wait-k model 10, the MILK model 20 reads the second input token x2 and then writes the first output token y1, so the translation performance may be better than the wait-k 10 model.

However, the MILK model 20 makes a decision every time a new input token is acquired, and makes a decision based on various information (for example, information on the input token identified so far and the generated output token), and thus compared to the wait-k model 10, a time to translate may be relatively large. In addition, the MILK model 20 is an autoregressive translation model and may read or write only one token per time step when performing a reading operation or a writing operation, and since a decision is made again when the operation is completed, it has a disadvantage in that an overall translation time may be relatively large. For example, referring to FIG. 2, the MILK model 20 may not generate a second output token y2, a third output token y3, a fourth output token y4, and a fifth output token y5 in one time step at the same time, and generate a next output token only after another decision is made when one token is generated.

A translation model according to the disclosure complements disadvantages of the conventional translation model described above, and has superior translation accuracy compared to the wait-k model 10 and may have a faster translation speed than the MILK model 20. Hereinafter, the translation model according to various example the disclosure will be described in greater detail below.

Figure 3:
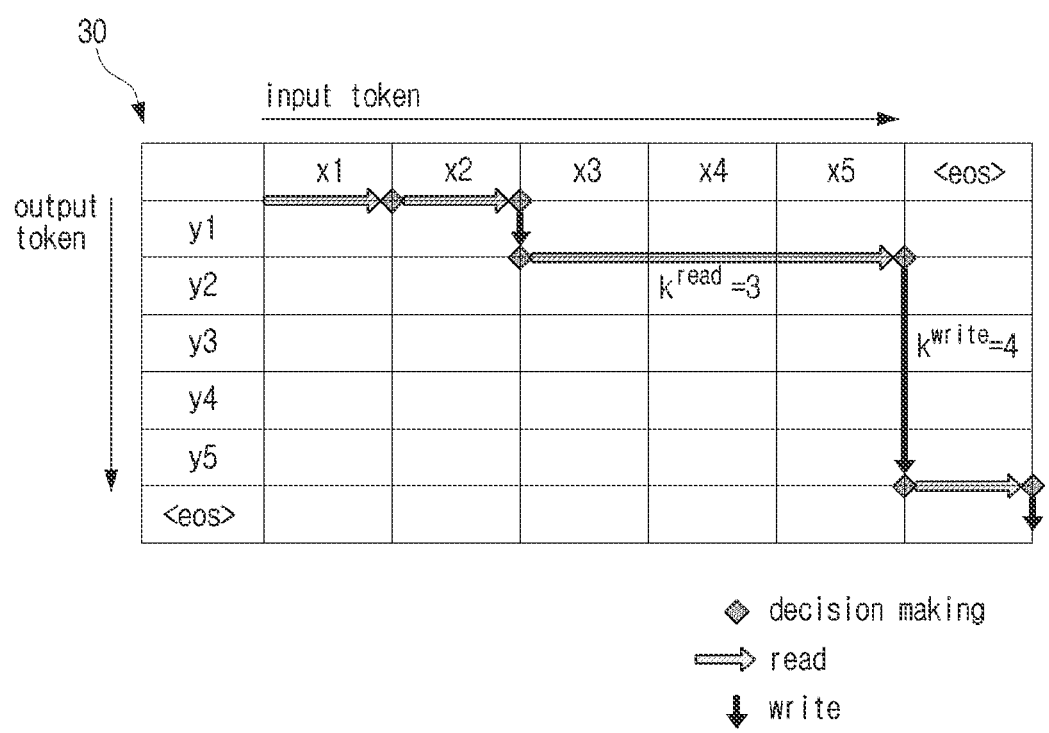
FIG. 3 is a diagram illustrating an example translation model according to various embodiments.

FIG. 3 is a diagram illustrating an example translation model according to various embodiments. When making a decision, a translation model 30 may not only determine which of the reading operation and the writing operation is to be performed, but may also acquire the number of tokens corresponding to the determined operation. When the reading operation is identified, the number of tokens corresponding to the determined operation may refer, for example, to the number of input tokens to be identified (or read) at a current time point. In addition, when the writing operation is identified, the number of tokens corresponding to the determined operation may refer, for example, to the number of output tokens to be generated at the current time point.

For example, the translation model 30 may generate the first output token y1 and then perform decision making to identify a reading operation and acquire the number of tokens (e.g., 3) corresponding to the reading operation. In this example, the translation model 30 may identify a third input token x3, a fourth input token x4, and a fifth input token x5. In this process, the translation model 30 does not need to perform additional decision making. In other words, unlike the MILK model 20, after reading the third input token x3, the fourth input token x4 may be read immediately without making a decision.

In addition, the translation model 30 may identify the writing operation by making a decision after reading the fifth input token x5 and acquire the number of tokens (e.g., 4) corresponding to the writing operation. In this case, the translation model 30 may generate a second output token y2, a third output token y3, a fourth output token y4, and a fifth output token y5 based on the first to fifth input tokens (x1 to x5). In this process, the translation model 30 may generate four output tokens in one time step without making additional decisions. Unlike the MILK model 20 model, the translation model 30 may generate multiple output tokens in one time step.

As such, the translation model 30 may acquire not only an operation to be performed at the current time point, but also the number of tokens corresponding to an operation to be performed through decision making Therefore, the translation model 30 has an advantage that a frequency of decision-making is low compared to the conventional translation model, and a translation speed is high. Hereinafter, a description will be given of how the translation model 30 makes a decision.

Figure 4A:
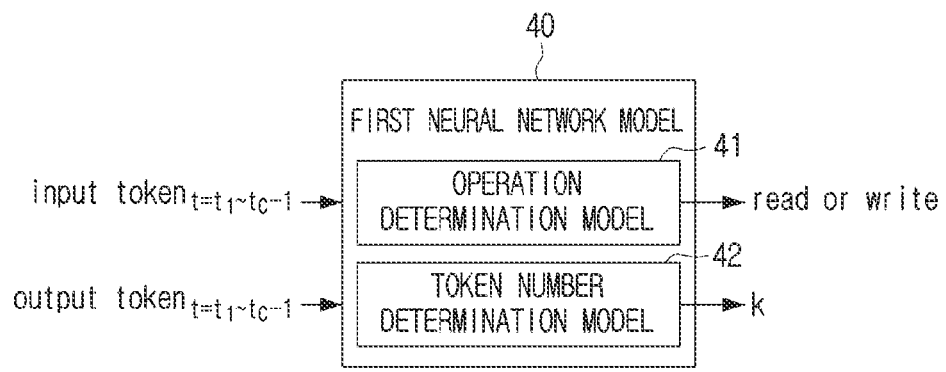
FIG. 4A is a diagram illustrating an example method of making a decision on a translation model according to various embodiments.
Figure 4B:
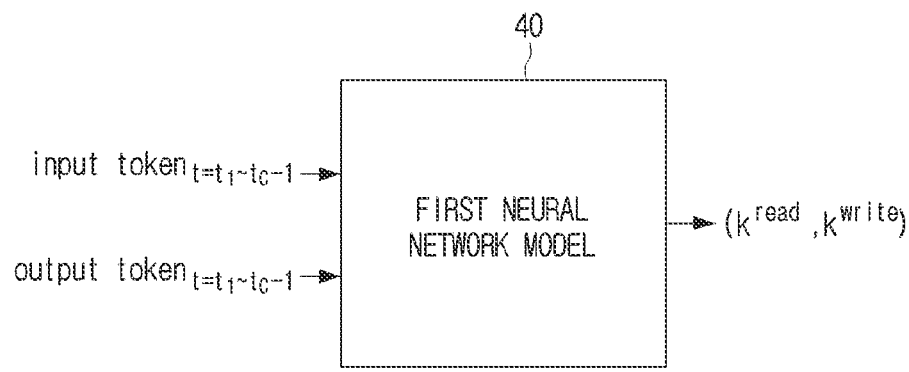
FIG. 4B is a diagram illustrating an example method of making a decision of a translation model according to various embodiments.

FIGS. 4A and 4B are diagrams illustrating an example method for determining a translation model according to various embodiments. The translation model 30 may perform decision making using a first neural network model 40. For example, the translation model 30 may input an input token identified (or read) and a generated output token before a current point in time ($t_c$) into the first neural network model 40 to acquire an operation to be performed at the current point in time ($t_c$) and the number of tokens corresponding to the operation to be performed. The first neural network model 40 may include an operation determination model (e.g., including various processing circuitry and/or executable program elements) 41 and a token number determination model (e.g., including various processing circuitry and/or executable program elements) 42. The operation determination model 41 may be trained to output an operation to be performed at the current point in time ($t_c$). For example, the operation determination model 41 may be trained to output a value corresponding to at least one of the reading operation and the writing operation based on the input token identified and the generated output token before the current point in time ($t_c$).

In addition, the token number determination model 42 may be trained to output the number of tokens based on the input tokens identified and the generated output tokens before the current point in time ($t_c$). The translation model 30 may identify an operation to be performed at the current time point ($t_c$) based on the output value of the operation determination model 41, and may acquire the number of tokens based on the output value of the token number determination model 42. The token number determination model 42 may include a first model trained to output the number of tokens corresponding to the reading operation and a second model trained to output the number of tokens corresponding to the writing operation. In this example, the translation model 30 may identify a model corresponding to the identified operation based on an output value of the operation determination model 41, and acquire the output value of the identified model as the number of tokens corresponding to the identified operation.

Referring to FIG. 4A, it is illustrated that the operation determination model 41 and the token number determination model 42 exist respectively, but this is only an example, and the operation determination model 41 and the token number determination model 42 may be integrated into one model. For example, referring to FIG. 4B, the first neural network model 40 may output the number of tokens for each operation. For example, when the first neural network model 40 outputs (3, 0), the translation model 30 may read three input tokens at the current point in time ($t_c$).

Figure 5A:
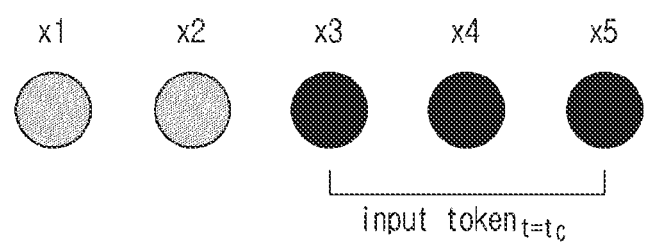
FIG. 5A is a diagram illustrating an example reading operation according to various embodiments.

As such, when decision making is completed, the translation model 30 may perform an operation based on a result of the decision making. FIG. 5A is a diagram illustrating an example reading operation according to various embodiments. The translation model 30 may identify the first input token x1 and the second input token x2 before the current point in time ($t_c$) and load them into a memory. In addition, the translation model 30 may identify a reading operation using the first neural network model 40 and acquire the number of tokens (e.g., 3). In this example, the translation model 30 may identify three input tokens that have not been identified among the tokens included in an input sentence, namely, a third input token x3, a fourth input token x4, and a fifth input token x5 to load into the memory.

Figure 5B:
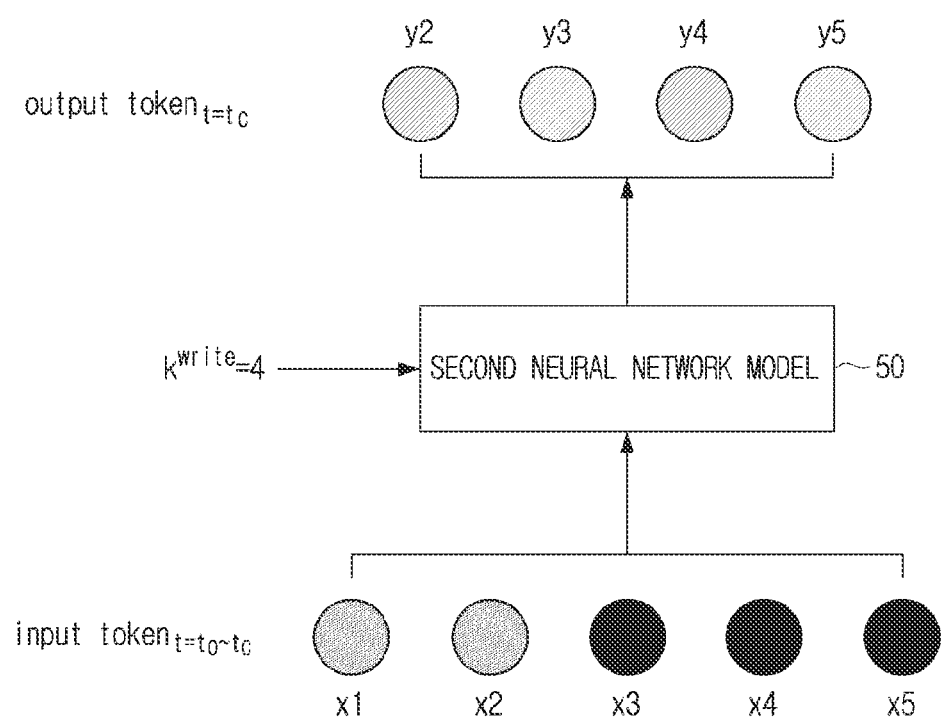
FIG. 5B is a diagram illustrating an example writing operation according to various embodiments.

FIG. 5B is a diagram illustrating an example writing operation according to various embodiments. The translation model 30 may generate an output token using a second neural network model (e.g., including various processing circuitry and/or executable program elements) 50. For example, the translation model 30 may input input tokens (x1, x2, x3, x4, x5) identified up to the current point in time ($t_c$) to the second neural network model 50 and acquire output tokens (y2, y3, y4, and y5). In this example, the second neural network model 50 may include a parameter for the number of output tokens. The translation model 30 may set or update a parameter for the number of tokens based on the number of tokens (e.g., 4) acquired based on the first neural network model 40.

An output value of the first neural network model 40 may be reflected in the second neural network model 50 in various ways, and the second neural network model 50 may output output tokens as many as the number of tokens that are the output values of the first neural network model 40. For example, the number of tokens output by the first neural network model 40 may be input to the second neural network model 50. In other words, the translation model 30 input the number of tokens output by the first neural network model 40 together with the input tokens (x1, x2, x3, x4, x5) identified up to the current point in time ($t_c$) to acquire output tokens as many as the number of input tokens.

Referring to FIG. 4A, it has been described that information on an operation to be performed at a current point in time and the number of tokens are output by the first neural network model 40, but this is merely an example, and the first neural network model 40 may only output information on the operation to be performed at the current point in time. In this case, the number of tokens may be calculated inside the second neural network model 50, and the second neural network model 50 may output output tokens as many as the number of tokens calculated based on the calculated number of tokens, input tokens identified before the current time point, and the generated output tokens.

The second neural network model 50 may be integrated with the first neural network model 40 to be implemented as a single model. For example, the second neural network model 50 may include the first neural network model 40. In this case, the second neural network model 50 may receive the input tokens identified before the current time point and the generated output tokens to calculate an operation to be performed at the current time point and the number of tokens, and output calculated tokens as many as the number of calculated tokens.

The second neural network model 50 may include an encoder and a decoder. Each of the encoder and decoder may include, for example, and without limitation, an attention layer and a feed-forward network (FNN). Since the second neural network model 50 may be implemented by applying a conventional neural network machine translation technique, a detailed description of the configuration may not be provided here.

The translation model 30 may, for example, and without limitation, be implemented as a so-called non-autoregressive translation model. In this example, the translation model 30 may generate several output tokens in one time step. As illustrated in FIG. 2, the autoregressive translation model may generate only one output token in one time step. Accordingly, a translation processing time of the translation model 30 according to the disclosure may be less than that of an existing autoregressive translation model (e.g., MILK model 20).

Figure 6A:
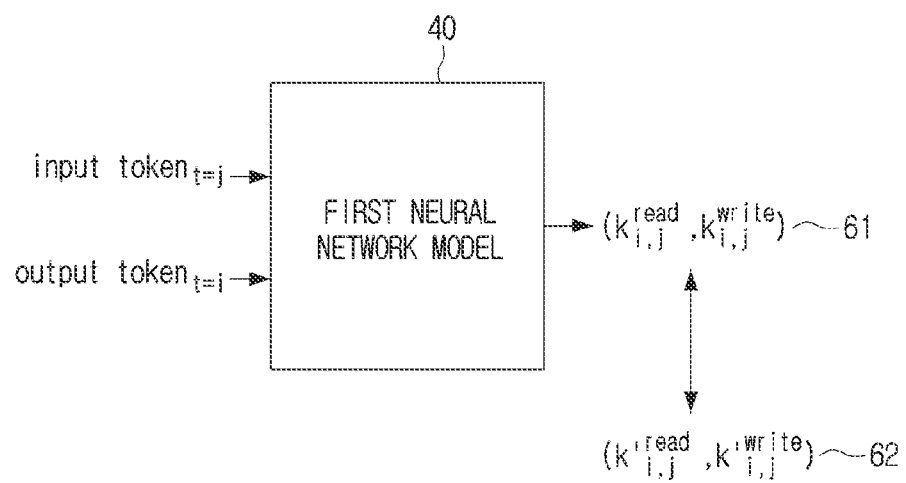
FIG. 6A is a diagram illustrating an example method of learning a first neural network model according to various embodiments.

FIG. 6A is a diagram illustrating an example method of learning a first neural network model according to various embodiments. The first neural network model 40 may be trained to output an operation to be performed at a second time point after a first time point and the number of tokens corresponding to the operation based on the input token identified up to the first time point and the generated output token. In this example, weights included in the first neural network model 40 may be updated such that a difference between an output value 61 of the first neural network model 40 and a label 62 is less than a predetermined value.

The label 62 may be acquired in various ways. For example, a label corresponding to a reading operation ($k'^{read}_{i,j}$) may be acquired based on [Equation 1], and a label corresponding to a writing operation ($k'^{write}_{i,j}$) may be acquired based on [Equation 2] below.

$$k'^{read}_{i,j}=E(k^{read}_{i,j})=\Sigma_a a \Pi_q \alpha_{(i+a)(j+a)} \qquad \text{[Equation 1]}$$

$$k'^{write}_{i,j}=E(k^{write}_{i,j})=\Sigma_b b \Pi_v \alpha_{(i+v)(j+b)} \qquad \text{[Equation 2]}$$

In [Equation] 1 and [Equation 2], j denotes a time step with respect to an input token, i denotes a time step with respect to an output token. In addition, α denotes an expected value for a probability of generating an output token at a specific point in time, and may be calculated based on an input token and an output token. Referring to FIG. 6B, the input token and the output token may be represented in a matrix form, and α corresponding to each location of the input token and the output token may be calculated. For example, $\alpha_{1,1}$ denotes an expected value of a probability of generating the first output token y1 while reading the first input token x1. As another example, $\alpha_{1,2}$ denotes an expected value of the probability of generating the first output token y1 while reading the first input token x1 and the second input token x2.

As another example, a label corresponding to each of a reading operation and a writing operation may be acquired based on a previously learned translation model. For example, referring again to FIG. 2, a label may be acquired based on a path for a reading operation and a writing operation performed by the MILK model 20. For example, a label (that is, $k'^{read}_{1,2}=3$) may be acquired based on information in which a third input token x3, a fourth input token x4, and a fifth input token x5 may be continuously identified.

Figure 7:
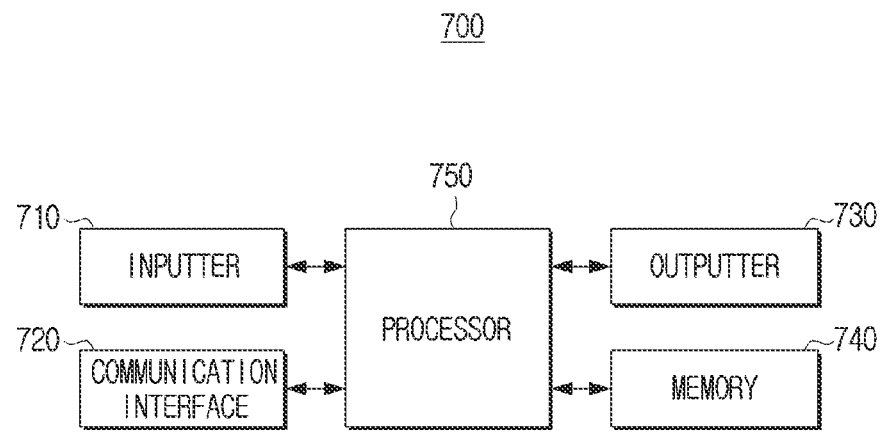
FIG. 7 is a block diagram illustrating an example configuration of an electronic apparatus according to various embodiments.

FIG. 7 is a block diagram illustrating an example configuration of an electronic apparatus according to an embodiment of the disclosure. The electronic apparatus 700 may include an inputter (e.g., including input circuitry) 710, a communication interface (e.g., including communication circuitry) 720, an outputter (e.g., including output circuitry) 730, a memory 740, and a processor (e.g., including processing circuitry) 750. For example, the electronic apparatus 700 may be a smartphone, but is not limited thereto, and may be implemented as various devices including, for example, and without limitation, a tablet PC, a wearable device, or the like.

The inputter 710 may include various input circuitry for the user to input data for controlling the electronic apparatus 700. The inputter 710 may acquire an input of the user who inputs a sentence to be translated. For example, the inputter 710 may include various input circuitry including, for example, and without limitation, a key pad, a dome switch, a touch pad (contact type capacitance method, pressure type resistive film method, infrared detection method, surface ultrasonic conduction method, integral tension measurement method, piezo effect method etc.), a jog wheel, a jog switch, or the like, but are not limited thereto. The processor 750 may acquire text corresponding to at least one sentence input by the user through the inputter 710.

The inputter 710 may include various input circuitry, including, for example, and without limitation, a microphone. In this example, the processor 750 may acquire the user's voice signal acquired through the inputter 710 and acquire a text corresponding to the voice signal.

The communication interface 720 may include at least one circuit and may perform communication with various types of external devices according to various types of communication methods. The communication interface 720 may perform data communication wirelessly or wired. When performing communication with an external device through a wireless communication method, the communication interface 720 may include at least one of a Wi-Fi communication module, a cellular communication module, a 3rd generation (3G) mobile communication module, a 4th generation (4G) mobile communication module, and a 4th generation Long term evolution (LTE) mobile communication module, a 5th generation (5G) mobile communication module. Meanwhile, the communication interface 720 according to an embodiment of the disclosure may be implemented as a wireless communication module, but this is only an embodiment, and may be implemented as a wired communication module (e.g., LAN, etc.).

The outputter 730 may include various output circuitry and may include a component for outputting a translated sentence acquired through the electronic apparatus 700 and providing it to the user. For example, the outputter 730 may include a display and a speaker. When the outputter 730 is a display, the outputter 730 may display a translated sentence (or output sentence). When the outputter 730 is a speaker, the outputter 730 may output an audio signal corresponding to the translated sentence.

The memory 740 may store an operating system (OS) for controlling the overall operation of components of the electronic apparatus 700 and commands or data related to the components of the electronic apparatus 700. For this operation, the memory 740 may be implemented as a nonvolatile memory (e.g., a hard disk, a solid state drive (SSD), a flash memory), a volatile memory, or the like. The memory 740 may store a translation model for translating an input sentence.

The processor 750 may include various processing circuitry and control the overall operation of the electronic apparatus 700. For example, the processor 750 may acquire an input sentence of a first language including a plurality of input tokens.

The processor 750 may acquire at least one first output token generated by translating at least one first input token and at least one first input token identified up to a first time point among the plurality of input tokens.

The processor 750 may input at least one first input token and at least one first output token to the learned first neural network model, and identify, among the first and second operations, an operation to be performed at a second time point after the first time point, and acquire the number of tokens corresponding to the identified operation. A first operation (or reading operation) may refer, for example, to an operation of identifying at least one second input token other than at least one first input token among the plurality of input tokens. Further, a second operation (or writing operation) may refer, for example, to an operation of generating at least one second output token based on at least one first input token.

The processor 750 may acquire an output sentence in a second language different from a first language by performing translation on the input sentence based on the identified operation and the number of acquired tokens. For example, when a first operation and a first number are identified, the processor 750 may identify the first number of second input tokens among at least one second input token and store them in the memory 750. As another example, when a second operation and a second number are identified, the processor 750 may update a parameter of a learned second neural network model to generate an output token by translating the input token based on the second number. In addition, the processor 750 may acquire the second number of output tokens by inputting at least one first input token into the second neural network model.

The first neural network model may include an operation determination model learned to identify one of the first operation and the second operation based on at least one first input token and at least one first output token. In addition, the first neural network model may include a model for determining the number of tokens learned to acquire the number of tokens based on at least one first input token and at least one first output token. The token number determination model may include a first model trained to output the number of tokens corresponding to the first operation and a second model trained to output the number of tokens corresponding to the second operation.

The processor 750 may acquire label data based on at least one first input token and at least one first output token. Also, the processor 750 may update the first neural network model such that a difference between the output value of the first neural network model and the label data is less than a predetermined value. The processor 750 may acquire label data based on an output value acquired by inputting at least one first input token and at least one first output token into a previously stored neural network model.

Functions related to artificial intelligence according to the disclosure may operate through the processor 750 and the memory 740. The processor 750 may be configured with one or a plurality of processors. In this example, one or the plurality of processors may include, for example, and without limitation, a general-purpose processor such as a CPU, AP, or a digital signal processor (DSP), a graphics-only processor such as a GPU, a vision processing unit (VPU), or an artificial intelligence-only processor such as an NPU. One or the plurality of processors control to process input data according to a predefined operation rule or an artificial intelligence model stored in the memory 740. When one or the plurality of processors are artificial intelligence-only processors, the artificial intelligence-only processor may be designed with a hardware structure specialized for processing a specific artificial intelligence model.

A predefined operation rule or artificial intelligence model may be characterized by being generated through learning. Being generated through learning may refer, for example, to a basic artificial intelligence model being learned using a plurality of learning data by a learning algorithm, such that the predefined operation rule or artificial intelligence model set to perform a desired characteristic (or purpose) is generated. Such learning may be performed in a device itself on which the artificial intelligence according to the disclosure is performed, or may be performed through a separate server and/or system. Examples of the learning algorithm include, for example, and without limitation, supervised learning, unsupervised learning, semi-supervised learning, or reinforcement learning, but are not limited to the examples described above.

The artificial intelligence model may include a plurality of neural network layers. Each of the plurality of neural network layers may have a plurality of weight values, and perform a neural network operation through an operation result of a previous layer and a plurality of weights. The plurality of weights of the plurality of neural network layers may be optimized by the learning result of the artificial intelligence model. For example, the plurality of weights may be updated to reduce or minimize a loss value or a cost value acquired from the artificial intelligence model during the learning process.

The electronic apparatus 700 may acquire an output sentence by performing machine translation on an input sentence. For example, the electronic apparatus 700 may receive a voice signal, which may, for example, include an analog signal, through a microphone, and convert a voice part into a computer-readable text using, for example, an automatic speech recognition (ASR) model, and acquire the user's speech intention by analyzing the converted text using, for example, a natural language understanding (NLU) model. The ASR model and/or the NLU model may be an artificial intelligence model (e.g., including various processing circuitry and/or executable program elements). The artificial intelligence model may be processed by an artificial intelligence dedicated processor designed with a hardware structure specialized for processing the artificial intelligence model. The artificial intelligence model may be generated through learning.

Linguistic understanding may refer, for example, to a technology that recognizes and applies/processes human language/characters, and includes natural language processing, machine translation, dialog system, question answering, speech recognition/synthesis, or the like.

The artificial neural network may include, for example, and without limitation, a deep neural network (DNN), such as convolutional neural network (CNN), deep neural network (DNN), recurrent neural network (RNN), generative adversarial network (GAN), restricted Boltzmann machine (RBM), deep belief network (DBN), bidirectional recurrent deep neural network (BRDNN), or deep Q-Networks, or the like, but is not limited to the embodiment described above.

FIG. 8 is a flowchart illustrating an example method of controlling an electronic apparatus according to various embodiments. The electronic apparatus 700 may acquire a first language including a plurality of input tokens (S810). The electronic apparatus 700 may acquire at least one first input token identified up to a first time point among a plurality of input tokens and at least one output token generated by translating at least one first input token (S820). At least one first input token and at least one first output token may be stored in the memory 740.

The electronic apparatus 700 may input at least one first input token and at least one first output token to a learned first neural network model, identify an operation to be performed at a second time point after the first time point among the second operations of generating at least one second output token, and acquire the number of tokens corresponding to the identified operation (S830). For example, when the first operation and the first number are identified, the electronic apparatus 700 may identify the first number of second input tokens among at least one second input token and store them in the memory 750. As another example, when the second operation and the second number are identified, the electronic apparatus 700 may update a parameter of the learned second neural network model to generate an output token by translating the input token based on the second number.

The electronic apparatus 700 may acquire an output sentence in a second language different from a first language by performing translation on the input sentence based on the identified operation and the number of acquired tokens (S840). The electronic apparatus 700 may acquire an output token by inputting at least one first input token into the second neural network model. In addition, when the second operation is identified after the second input token is identified, the electronic apparatus 700 may acquire an output token by inputting the first input token and the second input token into the second neural network model. In this example, when the second number is identified, the electronic apparatus 700 may acquire the second number of second output tokens.

The first neural network model may include an operation determination model learned to identify one of the first operation and the second operation based on at least one first input token and at least one first output token. In addition, the first neural network model may include a model for determining the number of tokens learned to acquire the number of tokens based on at least one first input token and at least one first output token. The token number determination model may include a first model trained to output the number of tokens corresponding to the first operation and a second model trained to output the number of tokens corresponding to the second operation.

The electronic apparatus 700 may acquire label data based on at least one first input token and at least one first output token. In addition, the electronic apparatus 700 may update the first neural network model such that a difference between the output value of the first neural network model and the label data is less than a predetermined value. In addition, the electronic apparatus 700 may acquire label data based on an output value acquired by inputting at least one first input token and at least one first output token into a pre-stored neural network model.

Various example embodiments described above may be embodied in a recording medium that may be read by a computer or a similar apparatus to the computer using software, hardware, or a combination thereof. In some cases, the embodiments described herein may be implemented by the processor itself. In a software configuration, various embodiments described in the disclosure such as a procedure and a function may be embodied as separate software modules. The software modules may respectively perform one or more functions and operations described in the present specification.

Methods according to various example embodiments may be stored on a non-transitory readable medium. When a computer instruction stored in such a non-transitory computer-readable medium is executed by a processor, a specific device may cause the processing operation according to the various embodiments described above to be performed.

The non-transitory computer readable recording medium may refer, for example, to a medium that stores data and that can be read by devices. For example, the non-transitory computer-readable medium may include, for example, and without limitation, a CD, DVD, a hard disc, Blu-ray disc, USB, a memory card, ROM, or the like.

The term "non-transitory storage medium may refer to a tangible device and does not include a signal (e.g., electromagnetic wave), and the term does not distinguish between the case that the data is permanently stored in the storage medium and the case that the data is temporarily stored in the storage medium. For example, the "non-transitory storage medium" may include a buffer in which data is temporarily stored.

According to an embodiment, the method according to various embodiments disclosed in the disclosure may be provided as being included in a computer program product. The computer program product may be traded between sellers and buyers as products. The computer program product may be distributed in the form of a device-readable storage medium (e.g., compact disc read only memory (CD-ROM)) or through application stores (e.g., Play Store™), or may be distributed (e.g., downloaded or uploaded) directly or online between two user devices (e.g., smartphones). In the case of online distribution, at least some of the computer program products (e.g. downloadable apps) may be temporarily stored on a storage medium readable by a device, such as a manufacturer's server, an application store's server, or a relay server, or may be temporarily generated.

While the disclosure has been illustrated and described with reference to various example embodiments, it will be understood that the various example embodiments are intended to be illustrative, not limiting. It will be understood by those skilled in the art that many alternatives, modifications, and variations may be made without departing from the true spirit and full scope of the disclosure, including the appended claims and their equivalents.

What is claimed is:

1. A method for controlling an electronic apparatus comprising:
    acquiring an input sentence of a first language including a plurality of input tokens;
    acquiring at least one first input token identified up to a first time point among the plurality of input tokens and acquiring at least one first output token generated by translating the at least one first input token;
    identifying an operation to be performed at a second time point after the first time point from among a first operation that identifies at least one second input token other than the at least one first input token among the plurality of input tokens and a second operation that generates at least one second output token based on the at least one first input token, and acquiring a number corresponding to the identified operation by inputting the at least one first input token and the at least one first output token into a learned first neural network model; and
    acquiring an output sentence of a second language different from the first language by translating the input sentence based on the identified operation and the acquired number.

2. The method of claim 1, further comprising:
based on the second operation and a second number being identified, updating a parameter of a second neural network model learned based on the second number, the second neural network model learned to generate an output token by translating an input token,
wherein the acquiring the output sentence includes acquiring an output token of the second number by inputting the at least one first input token into the second neural network model.

3. The method of claim 1, further comprising:
based on the first operation and a first number being identified, identifying and storing a second input token of the first number among the at least one second input token.

4. The method of claim 1,
wherein the first neural network model includes an operation determination model learned to identify one of the first operation and the second operation based on the at least one first input token and the at least one first output token, and
a token number determination model learned to obtain the number based on the at least one first input token and the at least one first output token.

5. The method of claim 4,
wherein the token number determination model includes a first model learned to output the number of tokens corresponding to the first operation, and a second model learned to output the number of tokens corresponding to the second operation.

6. The method of claim 1, further comprising:
acquiring label data based on the at least one first input token and the at least one first output token; and
updating the first neural network model such that a difference between an output value of the first neural network model and the label data is less than a predetermined value.

7. The method of claim 6,
wherein the acquiring the label data includes inputting the at least one first input token and the at least one first output token into a pre-stored neural network model to acquire the label data based on the acquired output value.

8. An electronic apparatus comprising:
an inputter comprising input circuitry configured to acquire an input sentence of a first language including a plurality of input tokens;
a memory configured to store at least one instruction; and
a processor,
wherein the processor is configured to control the electronic apparatus to: acquire at least one first input token identified up to a first time point among the plurality of input tokens, and acquire at least one first output token generated by translating the at least one first input token;

identify an operation to be performed at a second time point after the first time point among a first operation configured to identify at least one second input token other than the at least one first input token among the plurality of input tokens and a second operation configured to generate at least one second output token based on the at least one first input token, and acquire a number corresponding to the identified operation by inputting the at least one first input token and the at least one first output token into a learned first neural network model; and acquire an output sentence of a second language different from the first language by translating the input sentence based on the identified operation and the acquired number.

9. The apparatus of claim 8, wherein, based on the second operation and a second number being identified, the processor is configured to control the electronic apparatus to: update a parameter of a second neural network model, the second neural network model learned to generate an output token by translating an input token, and acquire an output token of the second number by inputting the at least one first input token into the second neural network model.

10. The apparatus of claim 8, wherein, based on the first operation and a first number being identified, the processor is configured to control the electronic apparatus to: identify a second input token of the first number among the at least one second input token; and store the token in the memory.

11. The apparatus of claim 8, wherein the first neural network model includes an operation determination model learned to identify one of the first operation and the second operation based on the at least one first input token and the at least one first output token, and a token number determination model learned to obtain the number based on the at least one first input token and the at least one first output token.

12. The apparatus of claim 11, wherein the token number determination model includes a first model learned to output the number of tokens corresponding to the first operation, and a second model learned to output the number of tokens corresponding to the second operation.

13. The apparatus of claim 8, wherein the processor is configured to control the electronic apparatus to: acquire label data based on the at least one first input token and the at least one first output token, and update the first neural network model such that a difference between an output value of the first neural network model and the label data is less than a predetermined value.

14. The apparatus of claim 13, wherein the processor is configured to control the electronic apparatus to input the at least one first input token and the at least one first output token into a pre-stored neural network model to acquire the label data based on the acquired output value.

15. A non-transitory computer-readable recording medium having stored thereon a program, which when executed, performs the method of claim 1 on a computer.

* * * * *